United States Patent
Shimizu

(10) Patent No.: US 7,168,739 B2
(45) Date of Patent: Jan. 30, 2007

(54) PASSENGER PROTECTING SYSTEM FOR AUTOMOTIVE VEHICLE HAVING SAFEGUARD DETECTING SYSTEM

(75) Inventor: Nobuyoshi Shimizu, Okazaki (JP)

(73) Assignee: Denso Corporation, Kariya (JP)

( * ) Notice: Subject to any disclaimer, the term of this patent is extended or adjusted under 35 U.S.C. 154(b) by 380 days.

(21) Appl. No.: 10/784,200

(22) Filed: Feb. 24, 2004

(65) Prior Publication Data

US 2004/0174005 A1 Sep. 9, 2004

(30) Foreign Application Priority Data

Mar. 5, 2003 (JP) .............................. 2003-058780

(51) Int. Cl.
*B60R 21/16* (2006.01)
(52) U.S. Cl. ........................................ 280/735; 701/45
(58) Field of Classification Search ................ 280/735; 701/45; 180/271, 282, 268; 307/10.1
See application file for complete search history.

(56) References Cited

U.S. PATENT DOCUMENTS

| | | | | |
|---|---|---|---|---|
| 5,357,141 A | * | 10/1994 | Nitschke et al. | ............ 307/10.1 |
| 5,389,822 A | * | 2/1995 | Hora et al. | ................ 307/10.1 |
| 5,904,723 A | * | 5/1999 | Kiribayashi et al. | ............ 701/45 |
| 5,977,653 A | * | 11/1999 | Schmid et al. | .............. 307/10.1 |
| 6,410,993 B1 | * | 6/2002 | Giers | ......................... 307/10.1 |
| 6,525,432 B1 | * | 2/2003 | Heckmann et al. | ......... 307/10.1 |
| 6,803,673 B1 | * | 10/2004 | Otterbach et al. | ............ 307/9.1 |
| 2002/0167224 A1 | | 11/2002 | Otterbach et al. | |
| 2004/0045760 A1 | * | 3/2004 | Baumgartner et al. | ....... 180/282 |
| 2004/0183291 A1 | * | 9/2004 | Shimizu | ...................... 280/735 |

FOREIGN PATENT DOCUMENTS

| | | |
|---|---|---|
| JP | A-11-17716 | 1/1999 |
| JP | A-2002-116822 | 4/2002 |
| JP | 2002200963 A * | 7/2002 |

* cited by examiner

*Primary Examiner*—Paul N. Dickson
*Assistant Examiner*—Joselynn Y. Sliteris
(74) *Attorney, Agent, or Firm*—Posz Law Group, PLC

(57) ABSTRACT

A plurality of passenger protecting devices, such as airbags or seatbelt pretensioners, are actuated by a controller upon detection of a collision. According to types of collision, particular passenger protecting devices are selected and actuated. The controller includes a main circuit and a safeguard circuit for actuating the passenger protecting devices, and the selected passenger protecting devices are actuated when both circuits generate signals for actuating the passenger protecting device. The passenger protecting devices to be selected according to types of collision are pre-programmed in the main circuit and automatically transmitted to the safeguard circuit.

4 Claims, 5 Drawing Sheets

FIG. 5

|  | VARIATION 1 | VARIATION 2 | VARIATION 3 |
|---|---|---|---|
| CH1 | AIRBAG IN FRONT OF DRIVER | AIRBAG IN FRONT OF DRIVER | 1ST AIRBAG IN FRONT OF DRIVER |
| CH2 | AIRBAG IN FRONT OF ASSISTANT | PRETENSIONER FOR DRIVER | 2ND AIRBAG IN FRONT OF DRIVER |
| CH3 | PRETENSIONER FOR DRIVER | SIDE AIRBAG FOR DRIVER | PRETENSIONER FOR DRIVER |
| CH4 | PRETENSIONER FOR ASSISTANT | AIRBAG IN FRONT OF ASSISTANT | PRETENSIONER FOR DRIVER'S REAR SEAT |
| CH5 | SIDE AIRBAG FOR DRIVER | PRETENSIONER FOR ASSISTANT | SIDE AIRBAG FOR DRIVER |
| CH6 | SIDE AIRBAG FOR ASSISTANT | SIDE AIRBAG FOR ASSISTANT | CURTAIN AIRBAG FOR DRIVER |

PASSENGER PROTECTING SYSTEM FOR AUTOMOTIVE VEHICLE HAVING SAFEGUARD DETECTING SYSTEM

CROSS-REFERENCE TO RELATED APPLICATION

This application is based upon and claims benefit of priority of Japanese Patent Application No. 2003-58780 filed on Mar. 5, 2003, the content of which is incorporated herein by reference.

BACKGROUND OF THE INVENTION

1. Field of the Invention

The present invention relates to a passenger protecting system for an automotive vehicle, the system including passenger protecting devices, such as airbags or seatbelt pretensioners, which are actuated upon detection of a collision.

2. Description of Related Art

A passenger protecting system having seat sensors for detecting passengers sitting thereon is disclosed in JPA-2002-200963. In this system, whether or not a passenger occupies a seat is detected by a seat sensor. A passenger protecting device for the particular seat which is not occupied is not actuated even when a collision is detected. Passenger protecting devices for other seats which are occupied are actuated upon detection of a collision. The passenger protecting system disclosed therein includes a main control unit, a safeguard control unit and a driving IC (a driving integrated circuit.

The main control unit determines switching elements for the protecting devices corresponding to the unoccupied seats based on signals from the seat sensors. Information regarding such switching elements not to be actuated upon detection of a collision is sent to the driving IC and to the safeguard control unit as well. The safeguard control unit also determines, independently from the main control unit, the switching elements not to be actuated upon detection of a collision. Only the switching elements indicated by both of the main and safeguard control units as those not to be actuated are finally selected as the switching elements not to be actuated. In this manner, the passenger protecting system disclosed in JP-A-2002-200963 is able to select the switching elements not to be actuated upon detection of a collision without using a hardware (such as MOSFET switches) disposed outside the passenger protecting system.

In the conventional passenger protecting system described above, however, the following problem is involved. That is, the passenger protecting devices corresponding to seats other than the unoccupied seats are all actuated regardless of types of collisions (a front collision, a right side collision or a left side collision). To eliminate this problem, a passenger protecting system in which the switching elements are selected according to types of collision has been proposed. This system will be briefly explained below with reference to FIG. 4.

The passenger protecting system 100 disclosed in FIG. 4 is mainly composed of a main control unit 101, a safeguard control unit 102 and a driving IC 103. The main control unit 101 includes a main detecting circuit 104 and a main driving signal generating circuit 105. Similarly, the safeguard control unit 102 includes a safeguard detecting circuit 106 and a safeguard driving signal generating circuit 107. The driving IC 103 includes an input interface 108 for main driving signals, another input interface 109 for safeguard driving signals, six main switching elements 110 and six safeguard switching elements 111. Each main switching element 110 is connected in series to each safeguard switching element 111 through a wire L100.

Operation of the passenger protecting system 100 will be briefly explained, taking a front collision as an example. Acceleration signals at a front collision are fed to the main detecting circuit 104 from main acceleration sensors (not shown in FIG. 4). The main detecting circuit 104 detects a type of collision based on the acceleration signals (a front collision is detected in this example). A signal 113 indicating a front collision is fed to an AND-gate 114. In the main driving signal generating circuit 105, a group of register channels 115 for a front collision are pre-programmed. In this particular example, register channels CH1, CH2, CH3 and CH4 are pre-programmed as the register channels for the front collision. Similarly, a register channel CH5 and a register channel CH6 are pre-programmed as register channels for a right side collision and for a left side collision, respectively.

Both the signal 113 indicating a front collision and the register channels 115 are fed to the AND-gate 114. The AND-gate 114 outputs main driving signals to register channels CH1–CH4 in the main input interface 108. Four main switching elements 110 corresponding to the register channels CH1–CH4, respectively, are driven.

The safeguard switching elements 111 are driven by the safeguard control unit 102 in the similar manner as described above. Signals from safeguard acceleration sensors (not shown in FIG. 4) are fed to the safeguard detection circuit 106. A signal 116 indicating a front collision and pre-programmed register channels 118 (i.e., CH1–CH4) are fed to an AND-gate 117. The AND-gate 117 outputs safeguard driving signals to register channels CH1–CH4 of the safeguard input interface 109. Four safeguard switching elements 111 corresponding to the register channels CH1–CH4, respectively, are driven by the safeguard driving signals.

When both of the main switching elements 110 and the safeguard switching elements 111 are driven, current flows through the wires L100 corresponding to CH1–CH4. Thus, actuators for the passenger protecting devices, such as airbags or seatbelt pretensioners, corresponding to the register channels CH1–CH4 are actuated.

The register channels CH1–CH6 can be allocated to respective passenger protecting devices in various ways. Three variations are shown in FIG. 5. In variation 1, for example, a register channel CH1 is allocated to an airbag positioned in front of a driver, CH2 to an airbag positioned in front of an assistant, CH3 to a seatbelt pretensioner for a driver, CH4 to a seatbelt pretensioner for an assistant, CH5 to a side airbag for a driver, and CH6 to a side airbag for an assistant. The allocation of register channels is pre-programmed both in the main driving signal generating circuit 105 and in the safeguard driving signal generating circuit 107.

The allocation of the register channels is not always the same, but it varies according to types of vehicles. Therefore, the allocation of the register channels has to be programmed for each vehicle type. Therefore, it has been difficult to use the main control unit 101 and the safeguard control unit 102 commonly to all types of vehicles. Also, it is required to tune-up program details in the main control unit 101, such as algorithm for detecting types of collision or detection criteria, according to specifications (such as a body shape, a body rigidity or a distance from an airbag to a driver) of each vehicle type. On the other hand, the safeguard unit 102 can be commonly used to various vehicle types except for the allocation of the register channels mentioned above. Therefore, if the programming of the register channel allocation in the safeguard driving signal generating circuit 107 is eliminated, the safeguard control unit 102 will be commonly used to most types of vehicles.

SUMMARY OF THE INVENTION

The present invention has been made in view of the above-mentioned problem, and an object of the present invention is to provide an improved passenger protecting system having the safeguard control unit that can be commonly used to various vehicle types.

The passenger protecting system according to the present invention is composed of a plurality of passenger protecting devices, such as airbags or seatbelt pretensioners, and a controller for actuating the passenger protecting devices upon detection of a collision. The controller includes a main control unit, a safeguard control unit and a driving integrated circuit (a driving IC). Both control units are connected to the driving IC.

The main control unit is composed of a main detecting circuit for detecting types of collision (a front collision, a right side collision and a left side collision) according to signals from main acceleration sensors. Similarly, the safeguard control unit is composed of a safeguard detecting circuit for detecting the types of collision according to signals from safeguard acceleration sensors. When a type of collision is detected by the main detecting circuit, some protecting devices to be actuated at that detected collision are selected from among the plurality of the protecting devices. Signals for driving the selected protecting devices are sent to the driving IC. Similarly, the type of collision is also detected by the safeguard detecting circuit, and protecting devices to be actuated are selected. Signals for driving the selected protecting devices are also sent to the driving IC. When the switching elements in the driving IC corresponding to the selected protecting devices are driven by the driving signals sent from both of the main control unit and the safeguard control unit, the selected protecting devices are actuated.

Information regarding the protecting devices to be selected according to the types of collision is pre-programmed in the main control unit, and the information stored in the main control unit is automatically transmitted to the safeguard control unit. The safeguard control unit includes a register frame that is capable of accommodating therein the register channels, the number of which is larger than the number of the plurality of protecting devices.

Since the information pre-programmed in the main control unit is automatically transmitted to the safeguard control unit, it is not necessary to pre-program that information in the safeguard control unit independently from the main control unit. Therefore, the safeguard control unit can be used commonly to various types of vehicles. Since the register frame in the safeguard control unit is designed to contain a number of register channels for covering all of the protecting devices, the safeguard control unit can be used commonly to most types of vehicles. Preferably, either of the safeguard detecting circuit or the safeguard driving signal generating circuit, or both, is integrally disposed with the driving IC to further simplify the structure of the controller.

Other objects and features of the present invention will become more readily apparent from a better understanding of the preferred embodiment described below with reference to the following drawings.

BRIEF DESCRIPTION OF THE DRAWINGS

FIG. 5 is a table showing examples of various allocation of register channels to passenger protecting devices.

DETAILED DESCRIPTION OF THE PREFERRED EMBODIMENT

Figure 1:
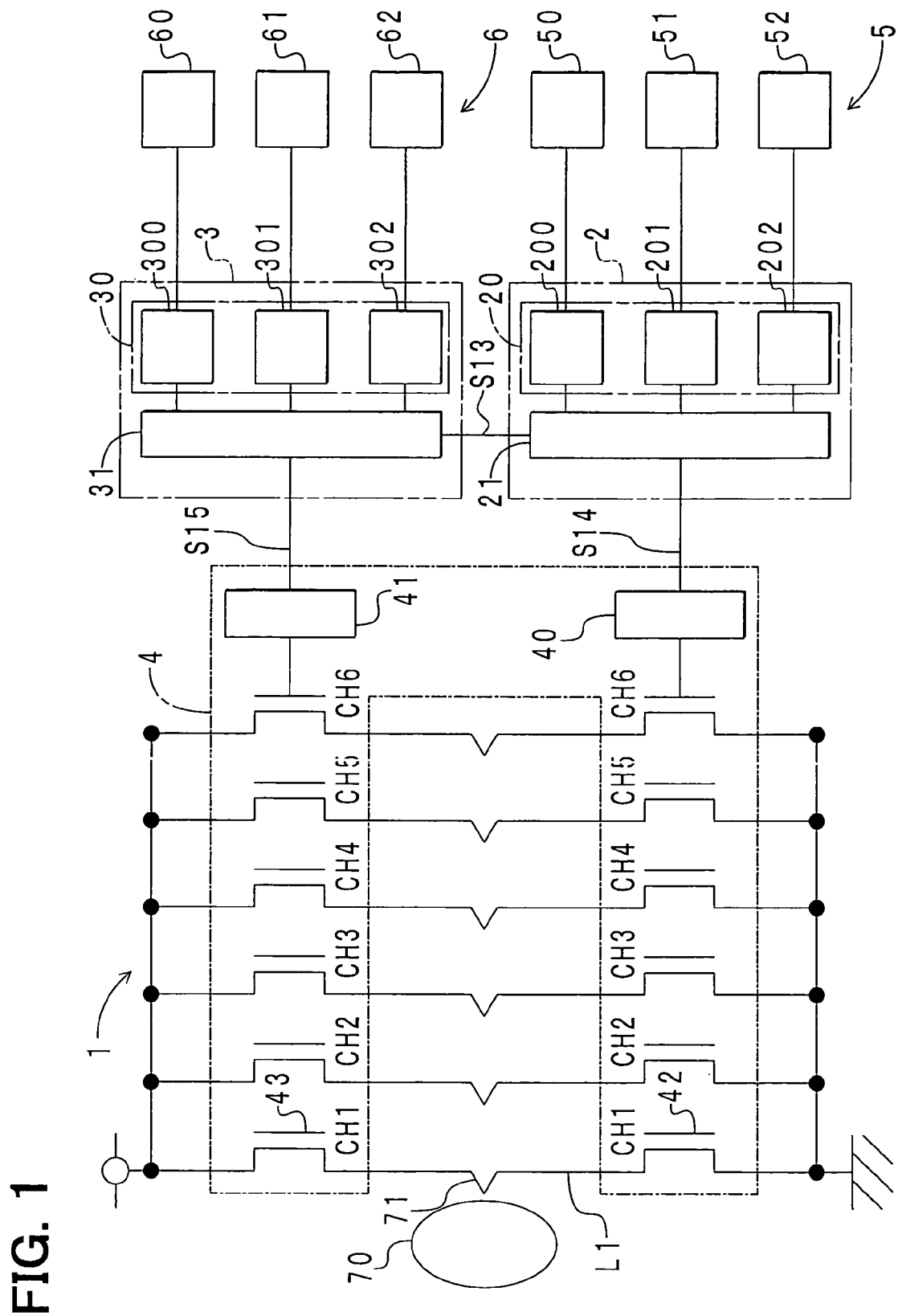
FIG. 1 is a block diagram showing an entire structure of a passenger protecting system according to the present invention.
Figure 2:
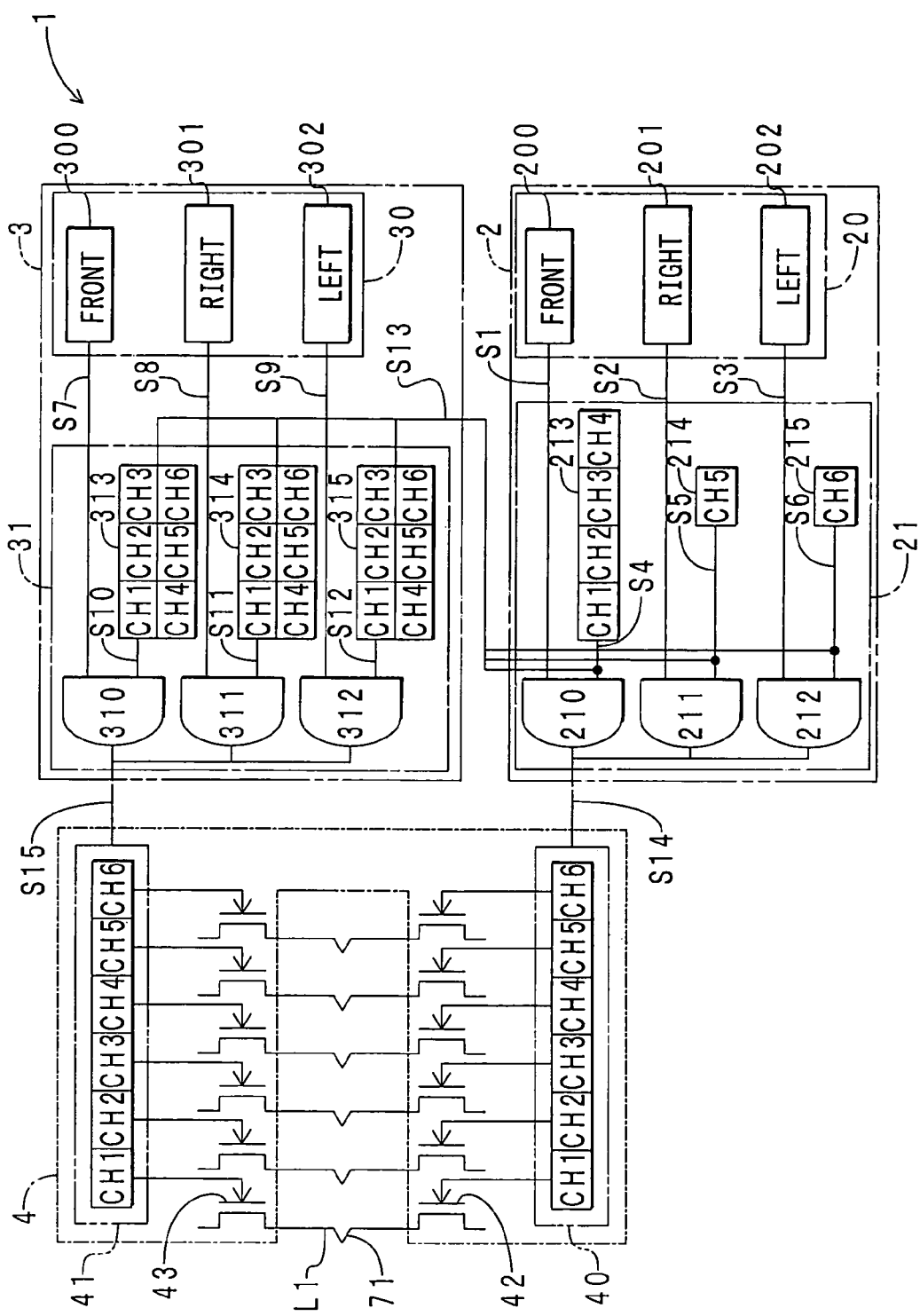
FIG. 2 is a block diagram showing a main control unit, a safeguard control unit and a driving integrated circuit used in the passenger protecting system shown in FIG. 1.

A preferred embodiment of the present invention will be described with reference to accompanying drawings. Referring to FIGS. 1 and 2, a structure of a passenger protecting system according to the present invention will be described. As shown in FIG. 1, the passenger protecting system 1 is mainly composed of a main control unit 2, a safeguard control unit 3 and a driving integrated circuit 4 (a driving IC 4). A main acceleration sensor 50 for detecting a front collision, a main acceleration sensor 51 for detecting a right side collision and a main acceleration sensor 52 for detecting a left side collision are connected to the main control unit 2. Similarly, safeguard acceleration sensors 60, 61, and 62 for detecting a front collision, a right side collision and a left side collision, respectively, are connected to the safeguard control unit 3.

The driving IC 4 driven by the output signals from the main control unit 2 and the safeguard control unit 3 is connected to both control units 2, 3. A passenger protecting device 70, such as an airbag or a seatbelt pretensioner, is actuated by respective actuators 71 (e.g., a squib in case of an airbag) connected to respective channels in the driving IC 4.

The structure of the main control unit 2, the safeguard control unit 3 and the driving IC 4 will be described in detail with reference to FIG. 2. The main control unit 2 includes a main detecting circuit 20 for detecting (or determining) types of collision and a main driving signal generating circuit 21. The main detecting circuit 20 is connected to the main acceleration sensors 50, 51, 52 (shown in FIG. 1). Based on the signals fed from the main acceleration sensors 50, 51, 52, the main detecting circuit 20 detects types of collision, i.e., it determines which type of collision occurred (a front collision, a left side collision or a right side collision).

Information regarding register channels selected for respective types of collision is pre-programmed in the main driving signal generating circuit 21. In this particular embodiment, register channels CH1–CH4 are selected for the front collision, CH5 for the right side collision, and CH6 for the left side collision. When a front collision is detected, a signal 200 indicating the front collision and information 213 as to the register channels CH1–CH4 selected for the front collision are fed to an AND-gate 210 through signal wires S1, S4, respectively. Similarly, a signal 201 indicating a right side collision and information as to register channels CH5 selected for the right side collision are fed to an AND-gate 211 through signal wires S2, S5, respectively. A signal 202 indicating a left side collision and information as to register channels selected for the left side collision are fed to an AND-gate 212 through signal wires S3, S6, respectively.

The safeguard control unit 3 includes a safeguard detecting circuit 30 for detecting (or determining) types of collision and a safeguard driving signal generating circuit 31. The safeguard detecting circuit 30 is connected to the safeguard acceleration sensors 60, 61, 62 (shown in FIG. 1). Based on the signals fed from the safeguard acceleration sensors 60, 61, 62, the safeguard detecting circuit 30 detects types of collision, i.e., it determines which type of collision occurred (a front collision, a left side collision or a right side collision).

A register frame 313 for the front collision, a register frame 314 for the right side collision and a register frame 315 for the left side collision, each frame being able to accommodate six register channels therein, are provided in the safeguard driving signal generating circuit 31. The information 213 as to register channels CH1–CH4 selected for the front collision and stored in the main driving signal generating circuit 21 is transmitted to the register frame 313 through a signal wire S13. Similarly, the information 214 and the information 215 stored in the main driving signal generating circuit 21 are transmitted to the register frames 314, 315, respectively, through the signal wire S13.

When the front collision is detected, a signal 300 indicating the front collision and the information 213 transmitted to the register frame 313 are fed to an AND-gate 310 through signal wires S7, S10, respectively. Similarly, a signal 301 indicating the right side collision and the information 214 transmitted to the register frame 314 are fed to an AND-gate 311 through signal wires S8, S11, respectively. A signal 302 indicating the left side collision and the information 215 transmitted to the register frame 315 are fed to an AND-gate 312 through signal wires S9, S12, respectively.

The driving IC 4 includes a main input interface 40, a safeguard input interface 41, six main switching elements 42 and six safeguard switching elements 43. The main input interface 40 having six register channels CH1–CH6 is connected to the AND-gates 210, 211, 212 through a signal wire S14. Similarly, the safeguard input interface 41 having six register channels CH1–CH6 is connected to the AND-gates 310, 311, 312 through a signal wire S15.

In this particular embodiment, the register channels CH1–CH6 are allocated to the respective passenger protecting devices as shown in variation 1 of FIG. 5. Each one of the safeguard switching elements 43 is connected in series to each one of the main switching elements 42 through a wire L1. For example, the register channel CH1 is allocated to the airbag positioned in front of the driver (refer to variation 1 in FIG. 5). A squib 71 for actuating the airbag is connected in the wire L1.

Now, operation of the passenger protecting system 1 will be described, taking the front collision as an example. When the signal from the acceleration sensor 50 for the front collision is fed to the main detecting circuit 20, the main detecting circuit generates the signal 200 indicating the front collision. Both the signal 200 and the information 213 as to the register channels CH1–CH4 pre-programmed for the front collision are fed to the AND-gate 210. The AND-gate 210 outputs a main driving signal which is fed to the main input interface 40. The main switching elements 42 corresponding to the four register channels CH1–CH4 are driven by the main driving signal.

Similarly, when the signal from the safeguard acceleration sensor 60 for the front collision is fed to the safeguard detecting circuit 30, the safeguard detecting circuit 30 generates the signal 300 indicating the front collision. Both the signal 300 and the information 213 transmitted from the main driving signal generating circuit 21 to the register frame 313 are fed to the AND-gate 310. The AND-gate 310 outputs a safeguard driving signal which is fed to the safeguard input interface 41. The safeguard switching elements 43 corresponding to the four register channels CH1–CH4 are driven by the safeguard driving signal.

When both of the main switching elements 42 and the safeguard switching element 43 are driven, current flows through the wires L1 corresponding to CH1–CH4. Thus, the passenger protecting devices corresponding to CH1–CH4 are actuated.

Following advantages are attained by the present invention. Since the information 213, 214, 215 as to the register channels selected for respective types of collision, which is pre-programmed in the main driving signal generating circuit 21, is automatically transmitted to the respective register frames 313, 314, 315, it is not necessary to program such information in the safeguard control unit 3. In other words, the process for programming such information in the safeguard control unit 3 is eliminated.

Since the register frames 313, 314, 315 are designed to accommodate six register channels, the safeguard control unit 3 can be commonly used for various types of vehicles as long as the number of passenger protecting devices is equal to or less than six. Since the safeguard control unit 3 is commonly used to various types of vehicles, it can be manufactured at low costs. Further, the cost for entire passenger protecting system 1 can be reduced.

Figure 3:
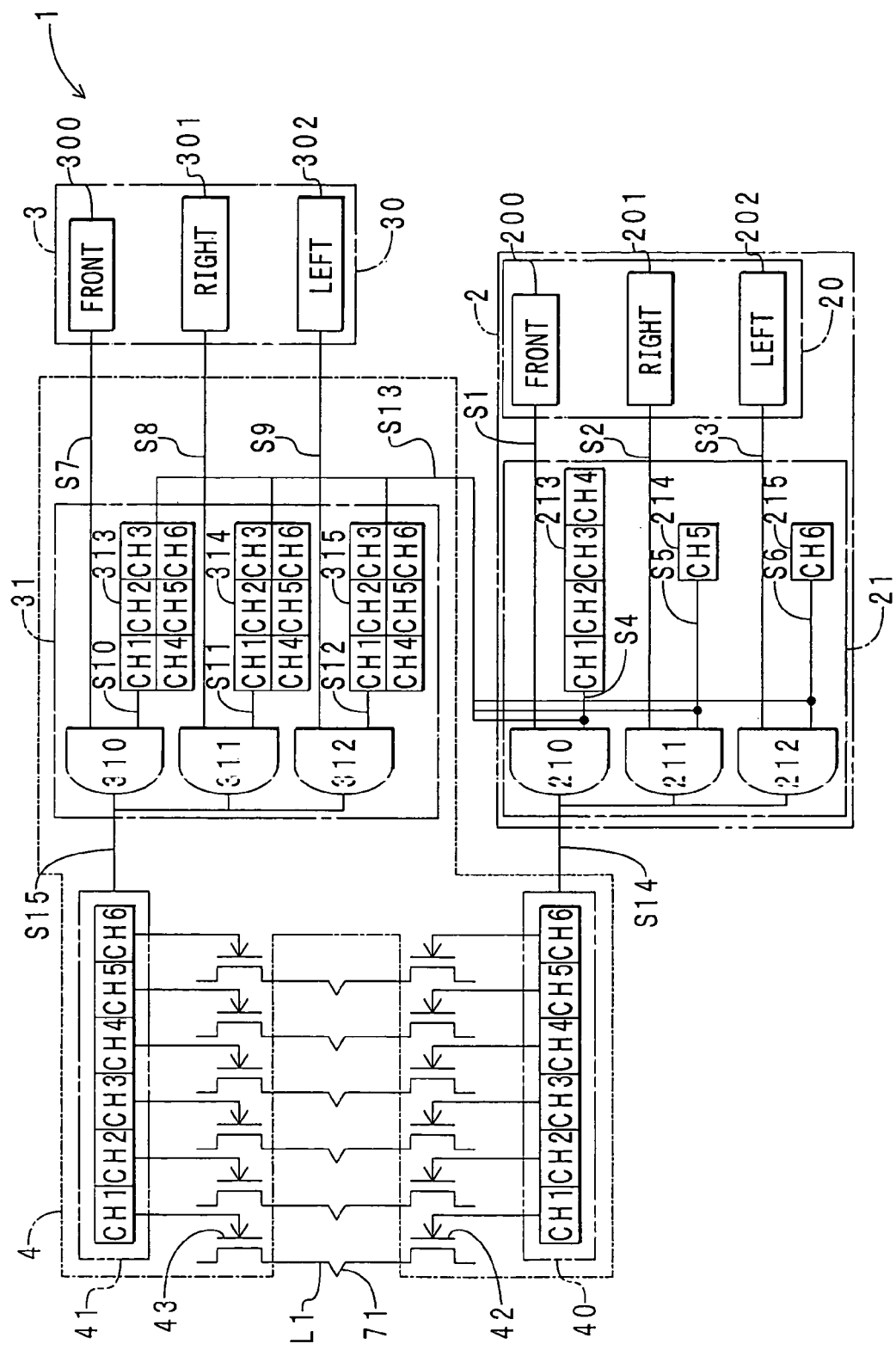
FIG. 3 is a block diagram showing a main portion of a modified form of the passenger protecting system.
Figure 4:
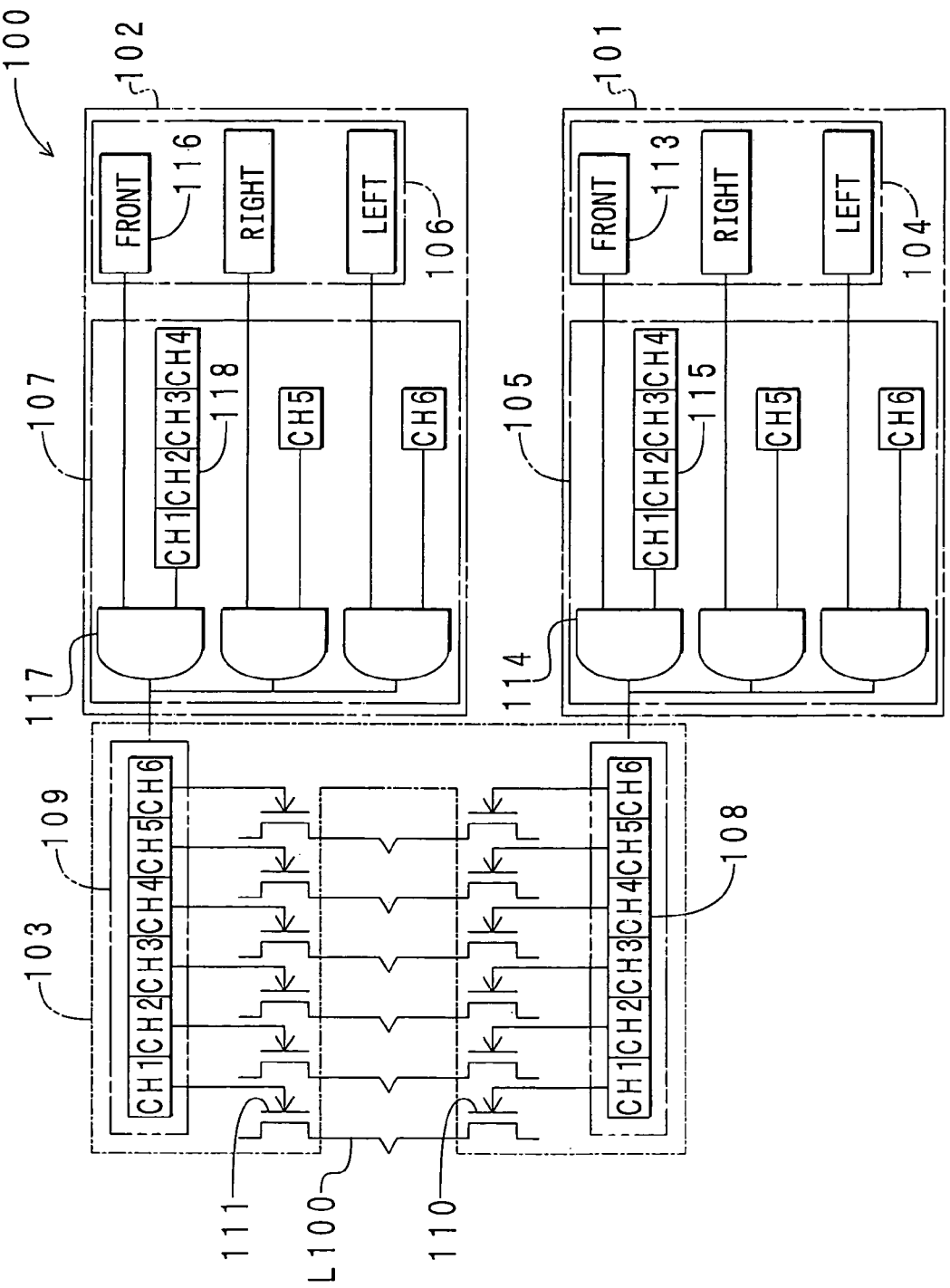
FIG. 4 is a block diagram showing a main portion of a conventional passenger protecting system.

The passenger protecting system 1 shown in FIG. 2 may be modified to a form shown in FIG. 3. In this modified form, the safeguard driving signal generating circuit 31 is integrally formed with the driving IC 4. Other structures and operation of the modified form are the same as those of the embodiment described above. Since the driving IC 4 can be commonly used to various vehicle types, the structure of the passenger protecting system 1 is further simplified by combining the safeguard driving signal generating circuit 31 with the driving IC 4. In addition, the signal wire S15 can be embedded in the driving IC 4, noise influence on the signal wire S15 is reduced or eliminated. Alternatively, the safeguard detecting circuit 30 may be integrally formed with the driving IC 4, or both of the safeguard detecting circuit 30 and the safeguard driving signal generating circuit 31 may be integrally formed with the driving IC 4.

The present invention is not limited to the embodiment described above, but it may be variously modified. For example, though the register frames 313, 314, 315 are designed to accommodate six register channels in the foregoing embodiment, they may be designed to accommodate more than six register channels. Further, it is not necessary that each register frame accommodates the same number of the register channels. The number of the register channels can be variously selected according to requirement of actual applications. The information as to the register channels pre-programmed in the main driving signal generating circuit 21 may be stored therein in a form of logical values, 1 and 0. Such information transmitted from the main driving signal generating circuit 21 to the safeguard driving signal generating circuit 31 may be stored therein in a form of logical values. Though the collision types are defined in three types, i.e., the front collision, the right side collision and the left side collision in the foregoing embodiment, other types of collision, e.g., a rollover collision or a backward collision, may be defined.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A passenger protecting system mounted on an automotive vehicle, the passenger protecting system comprising:
   a main control unit having a main detecting circuit for detecting types of collision based on signals from main acceleration sensors and a main driving signal generating circuit for generating main driving signals based on signals from the main detecting circuit;
   a safeguard control unit having a safeguard detecting circuit for detecting types of collision based on signals from safeguard acceleration sensors and a safeguard driving signal generating circuit for generating safeguard driving signals based on signals from the safeguard detecting circuit;
   a driving integrated circuit having main switching elements driven by the main driving signals and safeguard switching elements driven by the safeguard driving signals; and
   a plurality of passenger protecting devices mounted on the automotive vehicle to be actuated upon detection of a collision, wherein:
   some passenger protecting devices are selected from among the plurality of passenger protecting devices according to the types of collision and actuated when both of the main and the safeguard switching elements are driven; and
   information regarding the passenger protecting devices to be selected according to the types of collision are pre-programmed in the main control unit and the information is transmitted to the safeguard control unit.

2. The passenger protecting system as in claim 1, wherein:
   at least either one of the safeguard detecting circuit or the safeguard driving signal generating circuit is integrally formed with the driving integrated circuit.

3. The passenger protecting system as in claim 1, wherein:
   the safeguard control unit includes a register frame capable of containing register channels, the number of which is larger than that of the passenger protecting devices.

4. The passenger protecting system as in claim 3, wherein:
   the information regarding the passenger protecting devices to be selected according to the types of collision, which is transmitted from the main control unit to the safeguard control unit, is stored in the register frame as logical values.

* * * * *